United States Patent
Wang et al.

(10) Patent No.: US 12,552,894 B2
(45) Date of Patent: Feb. 17, 2026

(54) VISCOELASTIC ELASTOMERIC POLYURETHANE FOAMS, PROCESS FOR PREPARING THEM AND USE THEREOF

(71) Applicant: BASF SE, Ludwigshafen am Rhein (DE)

(72) Inventors: Liying Wang, Wyandotte, MI (US); Mohamed Bouguettaya, Wyandotte, MI (US); David Levy, Maumee, OH (US)

(73) Assignee: BASF SE, Ludwigshafen am Rhein (DE)

( * ) Notice: Subject to any disclaimer, the term of this patent is extended or adjusted under 35 U.S.C. 154(b) by 491 days.

(21) Appl. No.: 18/002,734

(22) PCT Filed: Jun. 21, 2021

(86) PCT No.: PCT/EP2021/066768
§ 371 (c)(1),
(2) Date: Dec. 21, 2022

(87) PCT Pub. No.: WO2021/259832
PCT Pub. Date: Dec. 30, 2021

(65) Prior Publication Data
US 2023/0272149 A1 Aug. 31, 2023

Related U.S. Application Data

(60) Provisional application No. 63/042,103, filed on Jun. 22, 2020.

(30) Foreign Application Priority Data

Jul. 15, 2020 (EP) .................................... 20185894

(51) Int. Cl.
| | |
|---|---|
| C08G 18/08 | (2006.01) |
| C08G 18/12 | (2006.01) |
| C08G 18/20 | (2006.01) |
| C08G 18/24 | (2006.01) |
| C08G 18/32 | (2006.01) |
| C08G 18/36 | (2006.01) |
| C08G 18/42 | (2006.01) |
| C08G 18/48 | (2006.01) |
| C08G 18/50 | (2006.01) |
| C08G 18/63 | (2006.01) |
| C08G 18/76 | (2006.01) |
| C08G 18/79 | (2006.01) |
| C08J 9/12 | (2006.01) |
| C08J 9/14 | (2006.01) |
| C08G 101/00 | (2006.01) |

(52) U.S. Cl.
CPC ............ *C08G 18/14* (2013.01); *C08G 18/12* (2013.01); *C08G 18/2027* (2013.01); *C08G 18/3281* (2013.01); *C08G 18/42* (2013.01); *C08G 18/4804* (2013.01); *C08G 18/485* (2013.01); *C08G 18/7657* (2013.01); *C08G 18/797* (2013.01); *C08J 9/125* (2013.01); *C08J 9/146* (2013.01); *C08G 2101/00* (2013.01); *C08G 2110/0008* (2021.01); *C08G 2110/005* (2021.01); *C08G 2110/0058* (2021.01); *C08J 2203/10* (2013.01); *C08J 2203/142* (2013.01); *C08J 2205/06* (2013.01); *C08J 2375/06* (2013.01); *C08J 2375/08* (2013.01)

(58) Field of Classification Search
None
See application file for complete search history.

(56) References Cited

U.S. PATENT DOCUMENTS

| | | | |
|---|---|---|---|
| 3,383,351 A | 5/1968 | Stamberger | |
| 4,089,835 A | 5/1978 | König et al. | |
| 4,230,823 A | 10/1980 | Alberts et al. | |
| 4,260,530 A | 4/1981 | Reischl et al. | |
| 4,293,470 A | 10/1981 | Cuscurida | |
| 4,374,209 A | 2/1983 | Rowlands | |
| 4,385,133 A | 5/1983 | Alberino et al. | |
| 4,454,255 A | 6/1984 | Ramlow et al. | |
| 4,458,038 A | 7/1984 | Ramlow et al. | |
| 4,460,715 A | 7/1984 | Hoffman et al. | |
| 4,522,975 A | 6/1985 | O'Connor et al. | |
| 4,689,354 A | 8/1987 | Ramlow et al. | |
| 5,167,899 A | 12/1992 | Jezic | |
| 6,617,369 B2 | 9/2003 | Parfondry et al. | |
| 8,426,482 B2 | 4/2013 | Frericks et al. | |
| 2004/0254256 A1 | 12/2004 | Lockwood et al. | |
| 2009/0306237 A1* | 12/2009 | Babb .................. | C08G 18/7621 521/170 |
| 2010/0204353 A1* | 8/2010 | Casati ................ | C08G 18/5024 521/137 |

(Continued)

FOREIGN PATENT DOCUMENTS

| | | |
|---|---|---|
| CN | 103702974 A | 4/2014 |
| DE | 1111 394 | 7/1961 |

(Continued)

OTHER PUBLICATIONS

European Search Report for EP Patent Application No. 20185894.1, Issued on Dec. 23, 2020, 3 pages.

(Continued)

*Primary Examiner* — Melissa A Rioja
(74) *Attorney, Agent, or Firm* — Baltazar Gomez

(57) ABSTRACT

Disclosed herein are viscoelastic elastomeric polyurethane foams, a process for preparing them and a method of using them in making shaped articles. Further disclosed herein are viscoelastic elastomeric polyurethane foams having improved, unique impact absorption performance.

14 Claims, No Drawings

(56) References Cited

U.S. PATENT DOCUMENTS

| | | |
|---|---|---|
| 2010/0227938 A1 | 9/2010 | Bauer et al. |
| 2011/0218258 A1 | 9/2011 | Ansgar et al. |
| 2012/0123005 A1 | 5/2012 | Cesar et al. |
| 2013/0030073 A1 | 1/2013 | Wardius et al. |
| 2015/0004389 A1* | 1/2015 | Corinti .................. C08J 9/0042 521/110 |

FOREIGN PATENT DOCUMENTS

| | | |
|---|---|---|
| DE | 1152 536 | 8/1963 |
| DE | 1152 537 | 8/1963 |
| DE | 1 222 669 | 8/1966 |
| DE | 19936481 A1 | 2/2001 |
| EP | 0 008 444 | 3/1980 |
| EP | 0 097 458 | 1/1984 |
| EP | 0 365 986 | 5/1990 |
| EP | 0 510 533 | 10/1992 |
| EP | 0 640 633 | 3/1995 |
| EP | 0 731 118 | 9/1996 |
| EP | 1240228 A1 | 9/2002 |
| WO | 2007085548 A1 | 8/2007 |

OTHER PUBLICATIONS

International Search Report and Written Opinion for corresponding PCT/EP2021/066768 mailed Sep. 28, 2021; 9 pages.

* cited by examiner

VISCOELASTIC ELASTOMERIC POLYURETHANE FOAMS, PROCESS FOR PREPARING THEM AND USE THEREOF

CROSS-REFERENCE TO RELATED APPLICATIONS

This application is a U.S. National Phase Application of International Patent Application No. PCT/EP2021/066768, filed Jun. 21, 2021, which claims priority to European Patent Application No. 20185894.1, filed Jul. 15, 2020, which claims priority to U.S. Patent Application No. 63/042,103, filed Jun. 22, 2020, and each of which is hereby incorporated by reference herein.

FIELD OF INVENTION

The present invention relates to viscoelastic elastomeric polyurethane foams, a process for preparing them and use thereof in making shaped articles. More particularly, it relates to the field of viscoelastic elastomeric polyurethane foams having improved, unique impact absorption performance.

BACKGROUND OF THE INVENTION

Viscoelastic polyurethane foams (PU foams) have attained ever greater importance in recent years. They are mostly used for producing upholstery, mattresses, pillows, or for damping of vibrations, for example in foam backing of carpets. These foams are typically characterized by a slow response to stress, have density range from 30-100 kg/m$^3$, and are made as bun foams or slab foams. With regards to cellular structure, these foams generally have an open-cell structure. The elastomeric polyurethane foams with microcellular structure, based on types, high density foam and low-density foam, find application in medical, automotive, aerospace and the like. These foams typically show fast response to stress, have density of more than 50 kg/m$^3$. Low-density foams are made as block foams or moulded foam parts, while high-density foams are generally moulded to achieve the desired shape in the finish products.

Each of the above-described foams have unique benefits and properties. The open cell foam is generally more flexible and softer with uniform cell size; however, it is less durable than microcellular polyurethane foam at a similar density. These foam characteristics are preferably set by choice of starting materials and control of chemical reaction during processing. Integral skins can be made out of these foams by incorporating blowing agents into the formulation, resulting in the foam with a unique structure, in which the core of the foam is less dense in comparison to the surface of the foam. The density profile built-up from surface to core brings some interesting properties and is suited for use in cushioning materials in furniture, automotive, and the like.

One possible way of producing viscoelastic PU foams is the use of mixtures of trifunctional polyether polyols having an OH value of from 20 mg KOH/g to 100 mg KOH/g and at least one trifunctional polyether polyol having OH value in between 160 mg KOH/g to 250 mg KOH/g and substantially propylene oxide units in the chain.

US 2004/0254256 describes viscoelastic foams, wherein the polyol component comprises from 30 to 70 parts by weight of a polyether alcohol having a high proportion of ethylene oxide units in the polyether chain. EP 1 240 228 describes the production of viscoelastic foams using polyether alcohols which have a high content of ethylene oxide in the polyether chain of at least 50% by weight and OH value in the range of 40 mg KOH/g to 50 mg KOH/g.

DE19936481 describes sound-absorbing, easy to process moulded flexible PUR foam which have a loss factor of >0.2 and comprise at least one castor oil polyetherol prepared by anionic polymerization using, for example, alkali metal hydroxides or cationic polymerization of castor oil with alkylene oxides. Pure castor oil can optionally be added, but in an amount of not more than 10%. A disadvantage here is that only small amounts of pure castor oil can be processed. Only as a result of the use of castor oil derivatives, which have to be prepared from castor oil in an additional production step, is the proportion of renewable raw materials increased significantly.

For ecological reasons, the market is increasingly demanding foams which comprise renewable raw materials. In production of polyurethanes, renewable raw materials can also be an alternative to petrochemically produced starting materials. The foams are usually produced using natural materials comprising hydroxyl groups or using polyols which are prepared by addition of alkylene oxides into these compounds.

WO 2007/085548 shows how viscoelastic foams which have a loss factor of >0.15 or a rebound resilience of <30% can be produced from renewable raw materials, preferably castor oil. The foams display viscoelastic behaviour over a wide range of temperature. A disadvantage here is that foams can only be made by slabstock process. The overall reactivity of the starting materials is insufficient for the manufacture of moulded foams.

U.S. Pat. No. 8,426,482 B2 discloses flexible open celled PU foams having viscoelastic properties and largely tack free surfaces using renewable materials. The foams are produced as flexible moulded foams and as flexible slabstock foams. The proportion of renewable raw materials in the polyol component is at least 25% by weight of the weight of the foam. The foam system disclosed here is mostly water blown.

For applications that call for high performance in shock absorption, dynamic impact attenuation, comfort and durability under various conditions, in combination with acceptable or greater mechanical properties is not discussed in the state of the art. Further, the existing foams are mostly open celled and/or flexible foams with viscoelastic properties. These foams are particularly characterized with recovery time of less than 10 s, density, for e.g. less than 100 kg/m$^3$, and low stiffness since these foams are typically made at low index, for e.g. 70-80, which results in undesired properties and less durable, and renders them suitable for regular use, such as cushions and mattresses. At higher densities or high index, the state-of-the-art foams are hard enough that the desired viscoelasticity is no longer observed.

It was, therefore, an object of the present invention to provide a viscoelastic elastomeric PU foam with a microcellular structure based on renewable raw materials, yet having acceptable or even superior characteristics, such as but not limited to, high shock absorption, dynamic impact attenuation, and water absorption, in combination with excellent mechanical properties, which render it suitable for applications which require high impact performance, comfort and durability, for e.g. protective equipment. It was another object of the present invention to provide a viscoelastic elastomeric PU foam which is easy to process using the conventional foaming systems and has a wide processing window.

SUMMARY OF THE INVENTION

Surprisingly, it has been found that the above-identified objects are met by providing a viscoelastic elastomeric PU foam which is obtained by reacting an isocyanate component comprising at least one isocyanate prepolymer having an NCO content in between 10 wt. % to 30 wt. % with an isocyanate reactive component comprising a mixture of polyols and a chain extender and/or crosslinker, in the presence of a blowing agent mixture comprising water and at least one hydrofluorocarbon or at least one hydrofluoroolefin.

Accordingly, in one aspect, the presently claimed invention is directed to a viscoelastic elastomeric polyurethane foam obtained by reacting a reactive mixture comprising:

(A) an isocyanate component comprising at least one isocyanate prepolymer (A1), wherein the isocyanate component has an NCO content in between 10 wt. % to 30 wt. %, and (B) an isocyanate reactive component comprising a mixture of
  (a) 60 wt. % to 95 wt. % of at least one natural oil polyol having an average functionality in between 2.0 to 4.0 and OH value in between 100 mg KOH/g to 200 mg KOH/g, determined according to DIN 53240,
  (b) 0.1 wt. % to 10.0 wt. % of at least one first polyether polyol having an average functionality in between 2.5 to 5.0 and OH value in between 200 mg KOH/g to 450 mg KOH/g, determined according to DIN 53240, which is prepared by addition of at least one alkylene oxide onto an amine,
  (c) 1.0 wt. % to 30.0 wt. % of at least one second polyether polyol having an average functionality in between 2.0 to 4.0 and OH value in between 20 mg KOH/g to 200 mg KOH/g, determined according to DIN 53240, which is prepared by addition of ethylene oxide and propylene oxide onto at least one H-functional starter substance, wherein the proportion of ethylene oxide is in between 40 wt. % to 95 wt. % based on the weight of the second polyether polyol, and
  (d) 0 wt. % to 10.0 wt. % of at least one chain extender and/or crosslinker having a molecular weight in between 40 g/mol to 499 g/mol,
wherein the wt. % is based on the sum of (a), (b), (c) and (d),
in the presence of
(C) a blowing agent mixture comprising water (C1) and (C2) at least one hydrofluorocarbon, or (C3) at least one hydrofluoroolefin.

In another aspect, the presently claimed invention is directed to a process for preparing the above viscoelastic elastomeric PU foam.

In still another aspect, the presently claimed invention is directed to the use of the above viscoelastic elastomeric PU foam in a shaped article.

In yet another aspect, the presently claimed invention is directed to a shaped article comprising the above viscoelastic elastomeric PU foam.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well, i.e. "a range of 1 to 10" or "in between 1 to 10" implies that both 1 and 10 are included in the range. For the avoidance of doubt, the applicant shall be entitled to any equivalents according to applicable law.

Viscoelastic Elastomeric PU Foam

An aspect of the present invention is embodiment 1, directed towards a viscoelastic elastomeric PU foam obtained by reacting a reactive mixture comprising:

(A) an isocyanate component comprising at least one isocyanate prepolymer (A1), wherein the isocyanate component has an NCO content in between 10 wt. % to 30 wt. %, and (B) an isocyanate reactive component comprising a mixture of
  (a) 60 wt. % to 95 wt. % of at least one natural oil polyol having an average functionality in between 2.0 to 4.0 and OH value in between 100 mg KOH/g to 200 mg KOH/g, determined according to DIN 53240,
  (b) 0.1 wt. % to 10.0 wt. % of at least one first polyether polyol having an average functionality in between 2.5 to 5.0 and OH value in between 200 mg KOH/g to 450 mg KOH/g, determined according to DIN 53240, which is prepared by addition of at least one alkylene oxide onto an amine,
  (c) 1.0 wt. % to 30.0 wt. % of at least one second polyether polyol having an average functionality in between 2.0 to 4.0 and OH value in between 20 mg KOH/g to 200 mg KOH/g, determined according to DIN 53240, which is prepared by addition of ethylene oxide and propylene oxide onto at least one H-functional starter substance, wherein the proportion of ethylene oxide is in between 40 wt. % to 95 wt. % based on the weight of the second polyether polyol, and
  (d) 0 wt. % to 10.0 wt. % of at least one chain extender and/or crosslinker having a molecular weight in between 40 g/mol to 499 g/mol,
  wherein the wt. % is based on the sum of (a), (b), (c) and (d),
  in the presence of
(C) a blowing agent mixture comprising water (C1) and (C2) at least one hydrofluorocarbon, or (C3) at least one hydrofluoroolefin.

In the present context, OH value is determined using DIN 53240.

In one embodiment, the viscoelastic elastomeric PU foam in the embodiment 1 is a microcellular elastomeric PU foam with viscoelastic characteristics. By "microcellular" it is referred to the morphology of the PU foam which is majorly characterised by very small cells with discrete cell structures and generally with holes on cell walls, with the average cell size typically below 200 μm, or even below 100 μm. In the present context, the PU foam is a "microcellular elastomeric PU foam with viscoelastic characteristics" if it has a density in between 90 kg/m$^3$ to 450 kg/m$^3$, determined according to ASTM D1622; a recovery time adjustable between 10-60 s, determined according to ASTM D3574; water absorption of less than 10 wt. % after 24 h, determined according to ASTM D2842; and hysteresis loss at 75% deflection of upto 96%, hysteresis loss at 40% deflection of upto 83% determined according to ASTM D3574.

Isocyanate Component (A)

In one embodiment, the isocyanate component (A) in the embodiment 1 has an NCO content in between 10 wt. % to 30 wt. %. In another embodiment, the NCO content in the embodiment 1 is in between 12 wt. % to 30 wt. %, or in between 12 wt. % to 29 wt. %, or in between 15 wt. % to 29 wt. %. In yet another embodiment, the NCO content in the embodiment 1 is in between 15 wt. % to 28 wt. %, or in between 18 wt. % to 28 wt. %. The NCO content may also be referred as isocyanate content or % NCO content, henceforth. It is well known to a person skilled in the art to measure and determine the NCO content and therefore, the present invention is not limited by the choice or selection of such techniques. For instance, ASTM D5155-96 can be used to determine the NCO content.

In one embodiment, the isocyanate component (A) in the embodiment 1 comprises at least one isocyanate prepolymer (A1). Suitable isocyanate prepolymer (A1) in the embodiment 1 is obtained by reacting a monomeric isocyanate with a prepolymer polyol. In an embodiment, the monomeric isocyanate can be an aliphatic isocyanate or an aromatic isocyanate. The monomeric isocyanate can be, for instance, a diisocyanate of the above mentioned aliphatic or aromatic isocyanate. Representative examples of these preferred diisocyanates may be found, for example, from U.S. Pat. Nos. 4,385,133, 4,522,975 and 5,167,899.

In an embodiment, the aliphatic isocyanate can comprise 6 to 100 carbon atoms linked in a straight chain or cyclized and having at least two reactive isocyanate groups. Suitable aliphatic isocyanates can be selected from tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cyclobutane-1, 3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)cyclohexane diisocyanates, 4,4'- and 2,4'-bis(isocyanatomethyl) dicyclohexane, isophorone diisocyanate and 4,4'-Diisocyanatodicyclohexylmethane.

In one embodiment, the aromatic isocyanate can be selected from toluene diisocyanate; diphenylmethane diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2, 4,6-triisocyanate; 1-ethyl-3,5-diisopropyl benzene-2,4,6-triisocyanate, tolidine diisocyanate, and 1,3,5-triisopropyl benzene-2,4,6-triisocyanate.

In another embodiment, the aromatic isocyanate is selected from toluene diisocyanate; diphenylmethane diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; and 1-methyl-3,5-diethylphenylene-2,4-diisocyanate. In yet another embodiment, it is selected from toluene diisocyanate; diphenylmethane diisocyanate; m-phenylene diisocyanate and 1,5-naphthalene diisocyanate. In still another embodiment, the aromatic isocyanate is diphenylmethane diisocyanate or MDI.

MDI is available in three different isomeric forms, 2,2'-MDI, 2,4'-MDI and 4,4'-MDI. In an embodiment, the monomeric isocyanate in the isocyanate prepolymer (A1) in the embodiment 1 consists of aromatic isocyanate, as described herein. In another embodiment, the monomeric isocyanate in the isocyanate prepolymer (A1) in the embodiment 1 is selected from 2,2'-MDI, 2,4'-MDI and 4,4'-MDI.

In one embodiment, the prepolymer polyol in the isocyanate prepolymer (A1) in the embodiment 1 can be selected from, but not limited to, the natural oil polyol (a), first polyether polyol (b), second polyether polyol (c), and other polyols described herein. Further, polyester polyols and polyether polyols, different than the natural oil polyol (a), first polyether polyol (b), second polyether polyol (c), can also be used for this purpose and are well known to the person skilled in the art.

Hydroxyl-functional polyethers, as suitable prepolymer polyol, having an average of two or more OH-functional groups per molecule are sometimes alternatively referred to as polyether polyols, which are typically formed as the polymeric reaction product of an organic oxide and an initiator compound containing two or more active hydrogen atoms may also be used. The active hydrogen compound in the presence of a base catalyst initiates ring opening and oxide addition, which is continued until the desired molecular weight is obtained. If the initiator has two active hydrogens, a diol results in. If a trifunctional initiator such as glycerine is used, the oxide addition produces chain growth in three directions, and a triol results in.

The hydroxyl-functional polyether can be any type of hydroxyl-functional polyether known in the art. The hydroxyl-functional polyether can be non-ethoxylated or ethoxylated. In addition, the hydroxyl-functional polyether can be short chain, low molecular weight hydroxyl-functional polyether having one or more OH-functional groups. Particularly suitable hydroxyl-functional polyether or polyethers for use in the polyurethanes include, but are not limited to, products obtained by the polymerization of a cyclic oxide, for example ethylene oxide (EO), propylene oxide (PO), butylene oxide (BO), or tetrahydrofuran in the presence of initiator compounds having one or more active hydrogen atoms. Suitable initiator compounds including a plurality of active hydrogen atoms for use in obtaining hydroxyl-functional polyethers include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other hydroxyl-functional polyether or polyethers, as suitable prepolymer polyols, include polyether diols and triols, such as polyoxypropylene diols and triols and poly(oxyethyleneoxypropylene)diols and triols obtained by the simultaneous or sequential addition of ethylene and propylene oxides to di- or tri-functional initiators. Copolymers having oxyethylene contents ranging from about 5 to about 90% by weight, based on the weight of the polyether polyol component, of which the polyether polyols may be block copolymers, random/block copolymers or random copolymers, can also be used. Yet other suitable hydroxyl-functional polyethers include polytetramethylene ether glycols obtained by the polymerization of tetrahydrofuran.

Particularly suitable hydroxyl-functional polyether or polyethers for use include those based on a totally heretic (or random) EO (ethylene oxide), PO (propylene oxide) structure, or those having heteric, but uniform blocks of EO and PO, e.g. blocks comprising EO and blocks comprising PO. As yet another suitable example, the hydroxyl-functional polyether can have heteric blocks and uniform blocks of EO and PO, e.g. blocks comprising all EO or PO and blocks comprising random EO, PO. Still further, in certain examples, the hydroxyl-functional polyether can be heteric or random copolymers of EO and PO which are endblocked with either EO or PO. One particularly suitable hydroxyl-functional polyether comprises a polyether-triol having ethyleneoxide terminal groups.

In certain of these embodiments, the hydroxyl-functional polyether or polyethers for use in forming the isocyanate-terminated prepolymers of the subject disclosure have a weight average molecular weight (Mw) ranging from 60 to 10,000, such as 180 to 6,500, g/mol, as measured by gel permeation chromatography (GPC) or nuclear magnetic resonance (NMR) previously calibrated using a calibration curve based on mono-dispersed polystyrene standards.

In another embodiment, the isocyanate component (A) in the embodiment 1 also includes another isocyanate prepolymer (A1') which is different from the isocyanate prepolymer (A1).

The isocyanate prepolymer (A1') can be obtained as a reaction product of any of the monomeric as well as polymeric isocyanates with suitable polyols. By the term "polymeric", it is referred to the polymeric grade of the aliphatic and/or aromatic isocyanate comprising, independently of each other, different oligomers and homologues. Further, suitable polyols can be selected from the ones described herein.

In an embodiment, the isocyanate component (A) in the embodiment 1 further comprises at least one selected from (A2) carbodiimide-modified isocyanates, (A3) polymeric methylene diphenyl diisocyanate, (A4) isocyanates comprising biuret and/or isocyanurate groups, and (A5) diphenylmethane 2,2'-, 2,4'- and/or 4,4'-diisocyanate.

In another embodiment, the isocyanate component (A) comprises a mixture of at least one isocyanate prepolymer (A1) with at least one selected from (A2) carbodiimide-modified isocyanates, (A3) polymeric methylene diphenyl diisocyanate, (A4) isocyanates comprising biuret and/or isocyanurate groups, and (A5) diphenylmethane 2,2'-, 2,4'- and/or 4,4'-diisocyanate.

In another embodiment, the isocyanate component (A) consists of a mixture of at least one isocyanate prepolymer (A1) with at least one selected from (A2) carbodiimide-modified isocyanates, (A3) polymeric methylene diphenyl diisocyanate, (A4) isocyanates comprising biuret and/or isocyanurate groups, and (A5) diphenylmethane 2,2'-, 2,4'- and/or 4,4'-diisocyanate.

In one embodiment, the isocyanate component (A) in the embodiment 1 is a mixture of (A1) isocyanate prepolymers and (A2) carbodiimide-modified isocyanates. In another embodiment, the carbodiimide-modified isocyanates (A2) include carbodiimide-modified diphenylmethane 2,2'-, 2,4'- and/or 4,4'-diisocyanate. In still another embodiment, the carbodiimide-modified isocyanates (A2) is carbodiimide-modified 4,4'-MDI.

In an embodiment, the amount of the isocyanate prepolymer (A1) in the embodiment 1 is in between 10 wt. % to 90 wt. %, based on the total weight of the isocyanate component (A). In another embodiment, the amount of the isocyanate prepolymer (A1) in the embodiment 1 is in between 20 wt. % to 90 wt. %, or in between 20 wt. % to 80 wt. %, or in between 30 wt. % to 80 wt. %. In yet another embodiment, the amount of the isocyanate prepolymer (A1) in the embodiment 1 is in between 30 wt. % to 70 wt. %, or in between 40 wt. % to 70 wt. %, or in between 40 wt. % to 60 wt. %.

In one embodiment, the isocyanate component (A) in the embodiment 1 further comprises a blowing agent, which is different than the blowing agent mixture (C). Suitable blowing agents in the isocyanate component (A) include physical blowing agents selected from hydrocarbons, hydrofluorocarbons, hydrofluoroolefins, hydrochlorofluorocarbons, hydrochlorofluoroolefins, fluorocarbons, dialkyl ethers, cycloalkylene ethers and ketones and fluorinated ethers.

Isocyanate Reactive Component (B)

The isocyanate reactive component (B) in the embodiment 1 comprises a mixture of
- (a) 60 wt. % to 95 wt. % of at least one natural oil polyol having an average functionality in between 2.0 to 4.0 and OH value in between 30 mg KOH/g to 600 mg KOH/g,
- (b) 0.1 wt. % to 10.0 wt. % of at least one first polyether polyol having an average functionality in between 2.5 to 5.0 and OH value in between 200 mg KOH/g to 450 mg KOH/g which is prepared by addition of at least one alkylene oxide onto an amine,
- (c) 1.0 wt. % to 30.0 wt. % of at least one second polyether polyol having an average functionality in between 2.0 to 4.0 and OH value in between 20 mg KOH/g to 200 mg KOH/g, which is prepared by addition of ethylene oxide and propylene oxide onto at least one H-functional starter substance, wherein the proportion of ethylene oxide is in between 40 wt. % to 95 wt. % based on the weight of the second polyether polyol, and
- (d) 0 wt. % to 10.0 wt. % of at least one chain extender and/or crosslinker having a molecular weight in between 40 g/mol to 499 g/mol, wherein the wt. % is based on the sum of (a), (b), (c) and (d).

Natural Oil Polyol (a)

Suitable natural oil polyols (a) in the embodiment 1 have an average functionality in between 2.0 to 4.0 and OH value in between 30 mg KOH/g to 600 mg KOH/g. In one embodiment, the natural oil polyol (a) in the embodiment 1 has an average functionality in between 2.0 to 3.8, or in between 2.0 to 3.6, or in between 2.0 to 3.4. In another embodiment, the natural oil polyol (a) in the embodiment 1 has an average functionality in between 2.0 to 3.2, or in between 2.0 to 3.0, or in between 2.2 to 3.0. In another embodiment, the natural oil polyol (a) in the embodiment 1 has an average functionality in between 2.5 to 3.0, or in between 2.5 to 2.9.

In one embodiment, the natural oil polyol (a) in the embodiment 1 has the OH value in between 30 mg KOH/g to 600 mg KOH/g, or in between 50 mg KOH/g to 300 mg KOH/g, or in between 100 mg KOH/g to 200 mg KOH/g, or in between 110 mg KOH/g to 190 mg KOH/g, or in between 120 mg KOH/g to 190 mg KOH/g. In another embodiment, the natural oil polyol (a) in the embodiment 1 has the OH value in between 120 mg KOH/g to 180 mg KOH/g, or in between 130 mg KOH/g to 180 mg KOH/g, or in between 130 mg KOH/g to 170 mg KOH/g. In another embodiment, the natural oil polyol (a) in the embodiment 1 has the OH value in between 140 mg KOH/g to 170 mg KOH/g, or in between 150 mg KOH/g to 170 mg KOH/g.

In one embodiment, the natural oil polyol (a) is selected from castor oil, polyhydroxy fatty acids, ricinoleic acid, hydroxyl-modified oils such as grapeseed oil, black cumin oil, pumpkin seed oil, borage seed oil, soybean oil, wheat germ oil, rapeseed oil, sunflower oil, peanut oil, apricot kernel oil, pistachio nut oil, almond oil, olive oil, macadamia nut oil, avocado oil, sea buckthorn oil, sesame oil, hemp oil, safflower oil, walnut oil, hydroxyl-modified fatty acids and fatty acid esters based on myristoleic acid, palmitoleic acid, oleic acid, vaccenic acid, petrosilinic acid, gadoleic acid, erucic acid, nervonic acid, linoleic acid, α- and γ-linoleic acid, stearidonic acid, arachidonic acid, timnodonic acid, clupanodonic acid, and cervonic acid.

In another embodiment, the natural oil polyol (a) in the embodiment 1 is castor oil and/or hydrogenated castor oil. These natural oils and fats can be modified by means of an addition reaction with alkylene. Here, alkylene oxides are preferably added in such an amount that the OH value of the addition product is in the range described herein. The addition reaction with the alkylene oxides can preferably be carried out using DMC catalysts.

Suitable amounts of the natural oil polyols (a) in the embodiment 1 is in the range of 65 wt. % to 95 wt. %, based on the sum of (a), (b), (c) and (d) as described herein. In one embodiment, the natural oil polyol (a) is present in the embodiment 1 in an amount in between 65 wt. % to 90 wt. %, or in between 70 wt. % to 90 wt. %, or in between 72 wt. % to 90 wt. %, or in between 75 wt. % to 90 wt. %. In another embodiment, the natural oil polyol (a) is present in the embodiment 1 in an amount in between 75 wt. % to 88 wt. %, or in between 78 wt. % to 88 wt. %, or in between 80 wt. % to 88 wt. %, or in between 80 wt. % to 85 wt. %.

First Polyether Polyol (b)

In an embodiment, the first polyether polyol (b) in the embodiment 1 has the average functionality in between 2.5 to 5.0 and OH value in between 200 mg KOH/g to 450 mg KOH/g. In one embodiment, the first polyether polyol (b) in the embodiment 1 has the average functionality in between 2.7 to 5.0, or in between 2.7 to 4.9, or in between 2.9 to 4.9. In another embodiment, the first polyether polyol (b) in the embodiment 1 has the average functionality in between 3.0 to 4.9, or in between 3.0 to 4.8, or in between 3.2 to 4.8. In still another embodiment, the first polyether polyol (b) in the embodiment 1 has the average functionality in between 3.2 to 4.5, or in between 3.5 to 4.5, or in between 3.5 to 4.3, or in between 3.6 to 4.3, or in between 3.8 to 4.2.

In one embodiment, the first polyether polyol (b) in the embodiment 1 has OH value in between 210 mg KOH/g to 450 mg KOH/g, or in between 210 mg KOH/g to 420 mg KOH/g, or in between 220 mg KOH/g to 420 mg KOH/g. In another embodiment, the first polyether polyol (b) in the embodiment 1 has OH value in between 220 mg KOH/g to 400 mg KOH/g, or in between 230 mg KOH/g to 400 mg KOH/g, or in between 230 mg KOH/g to 380 mg KOH/g. In yet another embodiment, the first polyether polyol (b) in the embodiment 1 has OH value in between 250 mg KOH/g to 380 mg KOH/g, or in between 250 mg KOH/g to 350 mg KOH/g, or in between 270 mg KOH/g to 320 mg KOH/g.

In one embodiment, the first polyether polyol (a) in the embodiment 1 is prepared by addition of at least one alkylene oxide onto an amine. Suitable amines for the first polyether polyol (a) in the embodiment 1 can be selected from diamino-methyldipropylamine, diaminomethyldiethylamine, diamino-methyl-ethylpropylamine, phenylenediamine, toluene diamine, diaminodiphenylmethane, ethanolamine, methylethanolamine, ethylethanolamine, diethanolamine, methyldiethanolamine, ethyldiethanolamine, triethanolamine and isomers thereof.

In one embodiment, isomers of the abovementioned amines for the first polyether polyol (a) in the embodiment 1 can be selected from 3,3'-diamino-N-methyldipropylamine, 2,2'-diamino-N-methyldiethylamine, 2,3-diamino-N-methylethylpropylamine, 1,2-phenylenediamine, 1,3-phenylenediamine, 1,4-phenylenediamine, 2,3-toluene diamine, 2,4-toluene diamine, 3,4-toluene diamine, 2,6-toluene diamine, 4,4'-diaminodiphenylmethane, 2,4'-diaminodiphenylmethane, 2,2'-diaminodiphenylmethane, ethanolamine, N-methylethanolamine, N-ethylethanolamine, diethanolamine, N-methyldiethanolamine, N-ethyldiethanolamine and triethanolamine.

In another embodiment, the amine in the first polyether polyol (b) in the embodiment 1 is based on aromatic amines, for example toluenediamine (TDA), phenylenediamine, diaminodiphenylmethane, and isomers thereof. When TDA is used, particular preference is given to using the o-isomers, also referred to as vicinal TDA.

Suitable alkylene oxides in the first polyether polyol (b) in the embodiment 1 can be selected from ethylene oxide, propylene oxide, butylene oxide, styrene oxide, isomers and mixtures thereof. In one embodiment, the alkylene oxide in the first polyether polyol (b) in the embodiment 1 can be propylene oxide. Ethylene oxide can also be used concomitantly, in particular when aromatic amines are used. The amount of ethylene oxide used is then preferably in the range of 2 wt. % to 15 wt. % based on the total weight of the first polyether polyol (a).

In one embodiment, the first polyether polyol (a) in the embodiment 1 is present in an amount in between 0.1 wt. % to 9.0 wt. % based on the sum of (a), (b), (c) and (d). In another embodiment, the first polyether polyol (a) in the embodiment 1 is present in an amount in between 0.5 wt. % to 9.0 wt. %, or in between 0.5 wt. % to 8.0 wt. %, or in between 0.5 wt. % to 7.0 wt. %. In yet another embodiment, the first polyether polyol (a) in the embodiment 1 is present in an amount in between 0.5 wt. % to 6.0 wt. %, or in between 0.5 wt. % to 5.0 wt. %, or in between 1.0 wt. % to 5.0 wt. %. In still another embodiment, the first polyether polyol (a) in the embodiment 1 is present in an amount in between 1.0 wt. % to 4.0 wt. %, or in between 1.0 wt. % to 3.5 wt. %.

Second Polyether Polyol (c)

In an embodiment, the second polyether polyol (c) in the embodiment 1 has the average functionality in between 2.2 to 4.0, or in between 2.2 to 3.8, or in between 2.4 to 3.8. In another embodiment, the second polyether polyol (c) in the embodiment 1 has the average functionality in between 2.4 to 3.6, or in between 2.5 to 3.6, or in between 2.5 to 3.5. In yet another embodiment, the second polyether polyol (c) in the embodiment 1 has the average functionality in between 2.8 to 3.5, or in between 2.8 to 3.3, or in between 2.9 to 3.1.

In one embodiment, the second polyether polyol (c) in the embodiment 1 has the OH value in between 30 mg KOH/g to 100 mg KOH/g, or in between 30 mg KOH/g to 90 mg KOH/g, or in between 40 mg KOH/g to 90 mg KOH/g. In another embodiment, the second polyether polyol (c) in the embodiment 1 has the OH value in between 40 mg KOH/g to 80 mg KOH/g, or in between 40 mg KOH/g to 70 mg KOH/g, or in between 40 mg KOH/g to 60 mg KOH/g. In yet another embodiment, the second polyether polyol (c) in the embodiment 1 has the OH value in between 40 mg KOH/g to 55 mg KOH/g.

In an embodiment, the second polyether polyol (c) in the embodiment 1 is prepared by addition of ethylene oxide and propylene oxide onto at least one H-functional starter substance, wherein the proportion of ethylene oxide is in between 40 wt. % to 95 wt. % based on the weight of the second polyether polyol (c). In another embodiment, the proportion of ethylene oxide in second polyether polyol (c) in the embodiment 1 is in between 60 wt. % to 85 wt. %, or in between 70 wt. % to 85 wt. %. Examples of H-functional starter substances include sugars, sugar alcohols, for e.g. glucose, mannitol, sucrose, pentaerythritol, sorbitol; polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

In one embodiment, the H-functional starter substances in the second polyether polyol (c) in the embodiment 1 include glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

In another embodiment, the second polyether polyol (c) in the embodiment 1 is a glycerol initiated polyoxypropylene-polyoxyethylene polyol having the average functionality in between 2.9 to 3.1, OH value in between 40 mg KOH/g to 55 mg KOH/g, with 75 wt. % EO and 25 wt. % PO based on the weight of the second polyether polyol (c).

In one embodiment, the second polyether polyol (c) in the embodiment 1 is present in an amount in between 1.0 wt. % to 20.0 wt. % based on the sum of (a), (b), (c) and (d). In another embodiment, the second polyether polyol (c) in the embodiment 1 is present in an amount in between 2.0 wt. % to 18.0 wt. %, or in between 5.0 wt. % to 18.0 wt. %, or in between 5.0 wt. % to 15.0 wt. %. In yet another embodiment, the second polyether polyol (c) in the embodiment 1 is present in an amount in between 8.0 wt. % to 15.0 wt. %, or in between 10.0 wt. % to 15.0 wt. %.

Chain Extender and/or Cross Linker (d)

Suitable chain extender and/or crosslinkers (d) have a molecular weight in between 40 g/mol to 499 g/mol. These compounds are typically present in the isocyanate-reactive component (B) to modify the hardness, increase stability, and reduce shrinkage of the foam. In an embodiment, the chain extender and/or crosslinkers (d) in the embodiment 1 can be selected from ethylene glycol, 1,2-propanediol, 1,3-propanediol, 1-5 pentanediol, 1,6-hexanediol, 1,10-decanediol, 1,2-dihydroxycyclohexane, 1,3-dihydroxycyclohexane, 1,4-dihydroxycyclohexane, diethylene glycol, 1,4-butanediol, 1,6-hexanediol, bis(2-hydroxy-ethyl) hydroquinone, dipropylene glycol, glycerol, diethanolamine, and triethanolamine.

In another embodiment, the chain extender and/or crosslinkers (d) in the embodiment 1 can be selected from ethylene glycol, 1,2-propanediol, 1,3-propanediol, 1-5 pentanediol, 1,6-hexanediol, 1,10-decanediol, 1,4-butanediol, 1,6-hexanediol, bis(2-hydroxy-ethyl)hydroquinone, dipropylene glycol, glycerol, diethanolamine, and triethanolamine.

In yet another embodiment, the chain extender and/or crosslinkers (d) in the embodiment 1 is triethanolamine. If required, the chain extender and/or crosslinkers (d) in the embodiment 1 can be present in an amount in between 0.1 wt. % to 10.0 wt. % based on the sum of (a), (b), (c) and (d). In an embodiment, the chain extender and/or crosslinkers (d) in the embodiment 1 can be present in an amount in between 0.1 wt. % to 10.0 wt. %, or in between 0.1 wt. % to 8.0 wt. %, or in between 0.1 wt. % to 5.0 wt. %. In another embodiment, the chain extender and/or crosslinkers (d) in the embodiment 1 can be present in an amount in between 0.1 wt. % to 4.0 wt. %, or in between 0.1 wt. % to 3.0 wt. %, or in between 0.1 wt. % to 2.0 wt. %. In yet another embodiment, the chain extender and/or crosslinkers (d) in the embodiment 1 can be present in an amount in between 0.5 wt. % to 2.0 wt. %.

Although, the isocyanate reactive component (B) in the embodiment 1 comprises of (a), (b), (c), and (d), it is also possible to comprise further constituents which are reactive towards isocyanate. These constituents can be polyols and/or diols different from (a), (b), (c), and (d). For instance, polyether polyols, and polyester polyols having average functionality and OH values different than the natural oil polyol (a), first polyether polyol (b) and second polyether polyol (c).

In one embodiment, the isocyanate reactive component (B) in the embodiment 1 further comprises a polymer polyol (e). These polymer polyols may have a nominal functionality ranging between 2.0 to 8.0 and OH value ranging between 10 mg KOH/g to 1000 mg KOH/g.

The polymer polyols are stable dispersions of polymer particles in a polyol and thus are not prone to settling or floating. The polymer particles are chemically grafted to the polyol and act as a better reinforcement filler so that the composition of the polymer may be adjusted to give the desired properties. Polymer polyols have a very low moisture content and thus avoid the problems of wet fillers. The polymers in polymer polyols generally have a low density in comparison to inorganic fillers, such as clays or calcium carbonate.

Suitable polymer polyols are selected from styrene-acrylonitrile (SAN) polymer polyols, polyurea suspension (PHD) polymer modified polyols and polyisocyanate polyaddition (PIPA) polymer modified polyols.

SAN polymer polyols are known in the art and are disclosed in Ionescu's Chemistry and Technology of Polyols and Polyurethanes, 2nd Edition, 2016 by Smithers Rapra Technology Ltd. In the SAN polymer polyols, a carrier polyol is the polyol in which the in-situ polymerization of olefinically unsaturated monomers is carried out, while macromers are polymeric compounds which have at least one olefinically unsaturated group in the molecule and are added to the carrier polyol prior to the polymerization of the olefinically unsaturated monomers. The use and function of these macromers is described, for example, in U.S. Pat. Nos. 4,454,255, 4,458,038 and 4,460,715. The SAN polymer polyols are usually prepared by free-radical polymerization of the olefinically unsaturated monomers, preferably acrylonitrile and styrene, in a polyether polyol or polyester polyol, usually referred to as carrier polyol, as continuous phase. These polymer polyols are prepared by in-situ polymerization of acrylonitrile, styrene or mixtures of styrene and acrylonitrile, e.g. in a weight ratio of from 90:10 to 10:90 (styrene:acrylonitrile), using methods analogous to those described in DE 1111394, DE 1222669, DE 1152536 and DE 1152537. Moderators, also referred to as chain transfer agents, can also be used for preparing SAN polymer polyols. The use and the function of these moderators is described, for example, in U.S. Pat. No. 4,689,354, EP 0 365 986, EP 0 510 533 and EP 0 640 633, EP 008 444, EP 0731 118.

PHD polymer modified polyols are usually prepared by in-situ polymerization of an isocyanate mixture with a diamine and/or hydrazine in a polyol, e.g. a polyether polyol. Methods for preparing PHD polymer modified polyols are described in, for example, U.S. Pat. Nos. 4,089,835 and 4,260,530.

PIPA polymer modified polyols are usually prepared by the in-situ polymerization of an isocyanate mixture with a glycol and/or glycol amine in a polyol. Methods for preparing PIPA polymer modified polyols are described in, for example, U.S. Pat. Nos. 4,293,470 and 4,374,209.

When used, suitable amounts of the polymer polyol (e) in the isocyanate reactive component (B) in the embodiment 1 can be added and are known to the person skilled in the art. For instance, the polymer polyol (e) in the isocyanate reactive component (B) in the embodiment 1 can be present in an amount in between 0.1 wt. % to 10 wt. %, based on the total weight of the isocyanate reactive component (B).

Blowing Agent Mixture (C)

In an embodiment, the blowing agent mixture (C) in the embodiment 1 comprises water (C1) and (C2) at least one hydrofluorocarbon or (C3) at least one hydrofluoroolefin. In one embodiment, the blowing agent mixture (C) in the embodiment 1 comprises water (C1) and (C2) at least one hydrofluorocarbon. In another embodiment, the blowing agent mixture (C) in the embodiment 1 comprises water (C1) and (C3) at least one hydrofluoroolefin.

In one embodiment, no other blowing agents other than the ones described herein, are present in the blowing agent mixture (C) in the embodiment 1. In another embodiment, mixture of hydrofluorocarbons (C2) or hydrofluoroolefins (C3), as described herein, can also be used along with water (C1).

Suitable hydrofluorocarbon (C2) in the embodiment 1 can be selected from 1,1,1,2-tetrafluoroethane, 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane, 1,1,3,3,3-pentafluoropropane, 1,1,1,3,3-pentafluoro-n-butane, 1,1,1,4,4,4-hexafluoro-n-butane, and 1,1,1,2,3,3,3-heptafluoropropane.

In one embodiment, the hydrofluorocarbon (C2) in the embodiment 1 can be selected from 1,1,1,2-tetrafluoroethane, 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane, and 1,1,3,3,3-pentafluoropropane. In another embodiment, the hydrofluorocarbon (C2) in the embodiment 1 can be selected from 1,1,1,2,2-pentafluoropropane, 1,1,1,3-tetrafluoropropane, 1,1,1,3,3-pentafluoropropane, and 1,1,3,3,3-pentafluoropropane. In yet another embodiment, the hydrofluorocarbon (C2) in the embodiment 1 is 1,1,3,3,3-pentafluoropropane, also commonly known as HFC 245fa.

Suitable hydrofluoroolefins (C3) in the embodiment 1 can be selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluoro-2-butene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form.

In one embodiment, the hydrofluoroolefins (C3) in the embodiment 1 can be selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluoro-2-butene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, and 1-bromo-2,3,3,3-tetrafluoropropene, in cis or trans form. In another embodiment, the hydrofluoroolefins (C3) in the embodiment 1 can be selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluoro-2-butene, 1-bromopentafluoropropene, in cis or trans form. In yet another embodiment, the hydrofluoroolefins (C3) in the embodiment 1 is 1,1,1,4,4,4-hexafluoro-2-butene, in cis or trans form.

In one embodiment, the blowing agent mixture (C) in the embodiment 1 comprises of water (C1) and 1,1,3,3,3-pentafluoropropane (C2). In another embodiment, the blowing agent mixture (C) in the embodiment 1 comprises of water (C1) and cis-1,1,1,4,4,4-hexafluoro-2-butene (C3).

In an embodiment, the amount of the blowing agent mixture (C) in the embodiment 1 is in between 0.1 wt. % to 10 wt. %, based on the total weight of the isocyanate reactive component In one embodiment, the reactive mixture further comprises at least one selected from catalysts (D), surfactants (E) and additives (F).

Catalyst (D)

The catalyst is typically not consumed in the exothermic reaction between the isocyanate component (A) and the isocyanate reactive component (B). More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc.

Exemplary catalysts (D) include amidines such as 2,3-dimethyl-3,4,5,6-tetrahydropyrimidine, tertiary amines such as triethylamine, tributylamine, dime-thylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethyl-aminoethyl) ether, bis(dimethylaminopropyl) urea, dimethylpiperazine, 1,2-dimethyl-imidazole, 1-azabicyclo[3.3.0]octane. In one embodiment, the catalyst (D) is selected from 1,4-diazabicyclo[2.2.2]octane and alkanolamine compounds such as triethanolamine, triisopropanolamine, N-methyl-diethanolamine and N-ethyldiethanolamine and dimethylethanolamine.

Further possibilities for catalysts (D) are organic metal compounds (i.e., organometallics), for e.g. organic tin compounds such as tin(II) salts of organic carboxylic acids, e.g. tin(II) acetate, tin(II) octoate, tin(II) ethylhexano-ate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate, or mixtures thereof.

Still further catalysts (D) include amine catalysts, which are a class of organic compounds derived from ammonia ($NH_3$) by substituting one or more of the hydrogen atoms with alkyl groups (carbon and hydrogen containing molecular chains)—e.g., dimethylcyclohexylamine [$(CH_3)_2NC_6H_{11}$]. An amine is primary, secondary, or tertiary depending on whether one, two, or three of the hydrogen atoms of ammonia are replaced. Most amines are basic and can combine readily with acids to form salts, some of which are useful as delayed-action catalysts. Catalytic activity of tertiary amines depends on their structure and basicity.

The amines and the organometallics have been found most useful for the present invention. Amine combinations are selectively used in order to establish an optimum balance between, reactivity, flow ability and viscosity build-up, and assuring "cure" (i.e., completeness of reaction) if desired. The organic metal compounds can be used either alone or preferably in combination with strongly basic amines.

Suitable amounts of the catalyst (D) that can be added to the reactive mixture is in between 0.01 wt. % to 10.0 wt. %, or in between 0.1 wt. % to 5.0 wt. %, based on the total weight of the isocyanate reactive component (B).

Surfactants (E)

The surfactant typically supports homogenization of the blowing agent mixture (C) and the isocyanate reactive component (B) and regulates a cell structure when foaming occurs. The surfactant (D) may include any suitable surfactant or mixtures of surfactants known in the art.

Non-limiting examples of suitable surfactants (D) include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxane-oxyalkylene copolymers and other organopolysiloxanes, oxyethylated alkylphenols, oxyethylated fatty alcohols, paraffin oils, castor oil, castor oil esters, and ricinoleic acid esters, and cell regulators, such as paraffins, fatty alcohols, and dimethylpolysiloxanes. One non-limiting example of the surfactant (D) is a silicone glycol copolymer, while other suitable surfactants (D) include organopolysiloxanes as products available under the trade name Dabco®, available from Air Products or Tegostab®, available from Evonik. Silicone-free surfactants available under the trade name Ortegol® from Evonik, can also be used.

Suitable amounts of the surfactant (E) that can be added to the reactive mixture is in between 0.01 wt. % to 5.0 wt. %, or in between 0.01 wt. % to 2.0 wt. %, based on the total weight of the isocyanate reactive component (B).

Additives (F)

Additives (F) that can be added to the reactive mixture in the embodiment 1 can be selected from alkylene carbonates, carbonamides, pyrrolidones, dyes, pigments, colorants, IR absorbing materials, UV stabilizers, fungistats, bacteriostats, hydrolysis controlling agents, curing agents, antioxidants, flame retardants, dispersing agents, and cell regulators. Suitable amount of these auxiliaries includes 0.1 wt. % to 20 wt. %, based on the total weight of the mixture. Further details regarding these auxiliaries can be found, for example, in Kunststoffhandbuch, Volume 7, "Polyurethane" Carl-Hanser-Verlag Munich, 1st edition, 1966, 2nd edition, 1983 and 3rd edition, 1993.

Suitable amounts of these additives (F) that can be added to the reactive mixture is in between 0.01 wt. % to 10.0 wt. %, based on the total weight of the isocyanate reactive component (B). The reaction of the reactive mixture in the embodiment 1 takes place at an index in between 70 to 120. In another embodiment, the index is in between 80 to 120, or in between 80 to 110, or in between 90 to 110. In the present context, the index of 100 corresponds to one isocyanate group per one isocyanate reactive group.

In one embodiment, the isocyanate reactive component (B) in the embodiment 1 comprises the mixture of (a), (b), (c), (d), blowing agent mixture (C), and optionally one or more of polymer polyol (e), catalysts (D), surfactants (E) and additives (F). The isocyanate reactive component (B) is also referred as B-side component, while the isocyanate component (A) is referred as Aside component.

In another embodiment, the B-side component is mixed with the A-side component at suitable index to form the reactive mixture, thereby forming the viscoelastic elastomeric PU foam of the embodiment 1. The B-side component, as described herein, comprises the mixture of (a), (b), (c), (d), blowing agent mixture (C), and optionally one or more of polymer polyol (e), catalysts (D), surfactants (E) and additives (F). Suitable amounts of ingredients (a), (b), (c), (d), (e), (C), (D), (E), and (F) are described herein.

The viscoelastic elastomeric PU foam of the embodiment 1, as described herein, is based on renewable raw materials i.e. natural oil polyol (a). The high content of renewable raw material makes the present invention environmentally sustainable. Further, the viscoelastic elastomeric PU foam of the embodiment 1 has acceptable or even improved characteristics, such as but not limited to, shock absorption, dynamic impact attenuation, water absorption, hysteresis loss, recovery time in combination with acceptable mechanical properties. In particular, the viscoelastic elastomeric PU foam of the embodiment 1 has a density in between 90 $kg/m^3$ to 450 $kg/m^3$, determined according to ASTM D1622; a recovery time adjustable between 10-60 s, determined according to ASTM D3574; water absorption of less than 10 wt. % after 24 h, determined according to ASTM D2842; and hysteresis loss at 75% deflection of upto 96%, hysteresis loss at 40% deflection of upto 83% determined according to ASTM D3574.

The viscoelastic elastomeric PU foam with a microcellular structure described herein has skin-core density profile. Upon impact, the foam stiffens dynamically, and it delays force transmission rate dynamically. Unlike the state-of-the-art flexible PU foam with open-cell structure, the foam in the invention worked synergistically from skin to core to absorb impact energy, which could provide novel solutions for impact energy management.

For impact absorption, the advantages associated with the present invention viscoelastic elastomeric PU foam of the embodiment 1 can be summarized as follows: (i) Sustainable solution with high renewable content; (ii) low water absorption; (iii) improved binding to fabric and other plastic material, i.e. can be foamed directly on a textile or a TPU film; (iv) Less force transfer at higher impact velocities compared to the state-of-the-art flexible PU foams, and delays force transmission considerably at lower impact velocities compared to the state-of-the-art viscoelastic flexible PU foams. The present invention PU foams provide novel solutions for impact energy management; (v) Broader isocyanate index range leads to achieve good processability, while wide processing window of the reactive mixture makes the viscoelastic elastomeric PU foam an ideal choice of material for a wide range of desired hardness; (vi) Lightweight with competitive performance compared to higher density products in the state-of-the-art viscoelastic flexible PU foams, i.e. high performance in energy absorption at lower density; (vii) Adjustable viscoelastic properties, recovery time, and hardness that suit for a variety of applications.

The abovementioned advantages of the viscoelastic elastomeric PU foam of the embodiment 1 makes it suitable for a wide range of application. For instance, the combination of impact performance with acceptable or improved mechanical properties makes the viscoelastic elastomeric PU foam of the embodiment 1 suitable for application in protective equipment. Such protective equipments include military and sports apparel applications, protective pad for wellness and medical applications such as table pads, hospital bed padding, wheelchair seat cushions, etc. and other similar fields wherein protection from sudden impact is required. Exemplary articles that can be made using the present invention viscoelastic elastomeric PU foam of the embodiment 1 include, such as but not limited to, wearable products such as safety equipment and gears, for e.g. head gear, shoulder guards, knee guards, elbow guards, helmets; consumer goods such as seating mats, pillows, shoe inserts.

Process

Another aspect of the present invention is embodiment 2, directed towards a process for preparing the viscoelastic elastomeric PU foam of the embodiment 1. In an embodiment, the viscoelastic elastomeric PU foam in the embodiment 2 is prepared by a single-shot process, wherein the reactive mixture is obtained by mixing the A-side component and the B-side component at a suitable index. The temperature for the A-side component or the B-side component can be ranging between 15° C. to 40° C., or in between 20° C. to 35° C. Both the A-side component and the B-side components are intensively mixed and reacted to prepare foam articles.

In an embodiment, the viscoelastic elastomeric PU foam in the embodiment 1 is produced in a mold. For this, the A-side component and the B-side component are mixed to form the reactive mixture prior to disposing the reactive mixture in the mold by means of a mixing station or a mixing machine or a mixing device. For example, the reactive mixture may be poured into an open mold or the mixture may be injected into a closed mold. The mold temperature can be at a temperature ranging from 20° C. to 65° C., or in between 30° C. to 60° C., which is controlled by temperature control unit.

For the purpose of the presently claimed invention, each of the A-side component and the B-side component is fed as a separate stream, for instance, in the mixing device prior to foaming. In one embodiment, the presently claimed invention refers to the two-component system, viz Aside component and B-side component respectively. However, it is possible that a multicomponent system can also be used. By the term "multicomponent system", it is referred to any number of streams, at least more than the conventionally existing two streams in the two-component system. For example, three, four, five, six or seven, separate streams can be fed to the mixing device. These additional streams can comprise one or more selected from ingredients (a), (b), (c), (d), (e), (C), (D), (E), and (F), as described hereinabove. In one embodiment, each of the streams in the multicomponent system is different from the A-side component and the B-side component, as described in the embodiment 1. In another embodiment, the third stream can be a mixture of (C) with at least one selected from (D), (E), and (F), while a first stream can be pure isocyanate and a second stream can be pure isocyanate reactive component, i.e. one or more selected from ingredients (a), (b), (c), (d), (e).

Suitable mixing devices for the purpose of the presently claimed invention are well known to the person skilled in the art, for example, a mixing head or a static mixer. While it is preferred that each stream enters separately in the mixing device, it is possible that the components within each stream are well mixed by suitable mixing means, for example, the static mixer. Moreover, the mixing can be continuous or discontinuous, depending on the final application of the viscoelastic elastomeric PU foam.

Static mixers are well known to the person skilled in the art for mixing of liquids, for example, as described in EP 0 097 458. Typically, the static mixers are tubular apparatuses with fixed internals which serve for the mixing of individual stream across the cross section of the tube. Static mixers can be used in continuous process for the conduct of various operations, for example, mixing, substance exchange between two phases, chemical reactions or heat transfer. The homogenization of the streams is brought about via a pressure gradient produced by means of a pump.

The mixing device, as described hereinabove, can be a low pressure or a high-pressure mixing device comprising:
(A) pumps to feed the streams,
(B) a high-pressure mixing head in which the streams are mixed,
(C) a first feed line fitted to the mixing head through which a first stream comprising the A side component is introduced into the mixing head, and
(D) a second feed line fitted to the mixing head through which a second stream comprising the B-side component is introduced into the mixing head.

Optionally, the mixing device, as described hereinabove, can further comprise at least one measurement and control unit for establishing the pressures of each of the feed lines in the mixing head. Also, the term "low pressure" here refers to a pressure in between 0.1 MPa to 5 MPa, or in between 1 MPa to 3 MPa, while the term "high-pressure" refers to pressure above 5 MPa, for e.g. in between 10 MPa to 25 MPa, or in between 12 MPa to 25 MPa.

In one embodiment, the viscoelastic elastomeric PU foam in the embodiment 1 or 2 when used in making shaped articles, has an advantage that micro-dispensing (micro-casting) of small size articles is easily achievable. For instance, the small size article can have a weight as low as few grams (for e.g. 50 g, 10 g, etc), or a shape such as, but not limited to, a strip, and a circular pad.

In another embodiment, the viscoelastic elastomeric PU foam in the embodiment 2 is easy to process using the conventional foaming machine systems, and big block or bun foams and molded foam products can be easily produced.

Use

Another aspect of the present invention is embodiment 3, directed towards the use of the viscoelastic elastomeric PU foam of the embodiment 1 or 2 in a shaped article.

Suitable shaped articles in the present context refer to protective equipment. Such protective equipments include military and sports apparel applications, protective pad for wellness and medical applications such as table pads, hospital bed padding, wheelchair seat cushions, etc. and other similar fields wherein protection from sudden impact is required. Exemplary articles that can be made using the present invention viscoelastic elastomeric PU foam of the embodiment 1 include, such as but not limited to, wearable products such as head gears, shoulder guards, knee guards, elbow guards, helmets; consumer goods such as seating mats, pillows, shoe inserts.

Shaped Article

Yet another aspect of the present invention is embodiment 4, directed towards the shaped article comprising the viscoelastic elastomeric PU foam of the embodiment 1 or 2, as described herein.

The presently claimed invention is illustrated in more detail by the following embodiments and combinations of embodiments which results from the corresponding dependency references and links:

I. A viscoelastic elastomeric polyurethane foam obtained by reacting a reactive mixture comprising:
(A) an isocyanate component comprising at least one isocyanate prepolymer (A1), wherein the isocyanate component has an NCO content in between 10 wt. % to 30 wt. %, and
(B) an isocyanate reactive component comprising a mixture of
(a) 60 wt. % to 95 wt. % of at least one natural oil polyol having an average functionality in between 2.0 to 4.0 and OH value in between 30 mg KOH/g to 600 mg KOH/g, determined according to DIN 53240,
(b) 0.1 wt. % to 10.0 wt. % of at least one first polyether polyol having an average functionality in between 2.5 to 5.0 and OH value in between 200 mg KOH/g to 450 mg KOH/g, determined according to DIN 53240, which is prepared by addition of at least one alkylene oxide onto an amine,
(c) 1.0 wt. % to 30.0 wt. % of at least one second polyether polyol having an average functionality in between 2.0 to 4.0 and OH value in between 20 mg KOH/g to 200 mg KOH/g, determined according to DIN 53240, which is prepared by addition of ethylene oxide and propylene oxide onto at least one H-functional starter substance, wherein the proportion of ethylene oxide is in between 40 wt. % to 95 wt. % based on the weight of the second polyether polyol, and
(d) 0 wt. % to 10.0 wt. % of at least one chain extender and/or crosslinker having a molecular weight in between 40 g/mol to 499 g/mol, wherein the wt. % is based on the sum of (a), (b), (c) and (d), in the presence of
(C) a blowing agent mixture comprising water (C1) and (C2) at least one hydrofluorocarbon, or (C3) at least one hydrofluoroolefin.

II. The viscoelastic elastomeric polyurethane foam according to embodiment I, wherein the isocyanate component has an NCO content in between 15 wt. % to 29 wt. %.

III. The viscoelastic elastomeric polyurethane foam according to embodiment I or II, wherein the isocyanate component (A) further comprises at least one selected from (A2) carbodiimide-modified isocyanates, (A3) polymeric methylene diphenyl diisocyanate, (A4) isocyanates comprising biuret and/or isocyanurate groups, and (A5) diphenylmethane 2,2'-, 2,4'- and/or 4,4'-diisocyanate.

IV. The viscoelastic elastomeric polyurethane foam according to one or more of embodiments I to III, wherein the isocyanate component is a mixture of (A1) isocyanate prepolymers and (A2) carbodiimide-modified isocyanates.

V. The viscoelastic elastomeric polyurethane foam according to one or more of embodiments I to IV, wherein the amount of the isocyanate prepolymer (A1) is in between 10 wt. % to 90 wt. %, based on the total weight of the isocyanate component (A).

VI. The viscoelastic elastomeric polyurethane foam according to one or more of embodiments I to V, wherein the amount of the isocyanate prepolymer (A1) is in between 40 wt. % to 60 wt. %, based on the total weight of the isocyanate component (A).

VII. The viscoelastic elastomeric polyurethane foam according to one or more of embodiments I to VI, wherein the isocyanate prepolymer (A1) is obtained by reacting a monomeric isocyanate with a prepolymer polyol.

VIII. The viscoelastic elastomeric polyurethane foam according to embodiment VII, wherein the monomeric isocyanate is 4,4'-diphenylmethane diisocyanate.

IX. The viscoelastic elastomeric polyurethane foam according to one or more of embodiments III to VIII, wherein the carbodiimide-modified isocyanate (A2) is a carbodiimide-modified diphenylmethane 2,2'-, 2,4'- and/or 4,4'-diisocyanate.

X. The viscoelastic elastomeric polyurethane foam according to one or more of embodiments I to IX, wherein the natural oil polyol (a) has an average functionality in between 2.0 to 3.0 and OH value in between 100 mg KOH/g to 200 mg KOH/g, determined according to DIN 53240.

XI. The viscoelastic elastomeric polyurethane foam according to one or more of embodiments I to X, wherein the natural oil polyol (a) is castor oil and/or hydrogenated castor oil.

XII. The viscoelastic elastomeric polyurethane foam according to one or more of embodiments I to XI, wherein the amount of the natural oil polyol (a) is in between 75 wt. % to 90 wt. %, based on the sum of (a), (b), (c) and (d).

XIII. The viscoelastic elastomeric polyurethane foam according to one or more of embodiments I to XII, wherein the first polyether polyol (b) has an average functionality in between 3.5 to 4.5 and OH value in between 270 mg KOH/g to 320 mg KOH/g, determined according to DIN 53240.

XIV. The viscoelastic elastomeric polyurethane foam according to one or more of embodiments I to XIII, wherein the amine in the first polyether polyol (b) is selected from toluenediamine, phenylenediamine, diaminodiphenylmethane, and isomers thereof.

XV. The viscoelastic elastomeric polyurethane foam according to one or more of embodiments I to XIV, wherein the amount of the first polyether polyol (b) is in between 0.5 wt. % to 5.0 wt. %, based on the sum of (a), (b), (c) and (d).

XVI. The viscoelastic elastomeric polyurethane foam according to one or more of embodiments I to XV, wherein the second polyether polyol (c) has an average functionality in between 2.5 to 3.5 and OH value in between 40 mg KOH/g to 55 mg KOH/g, determined according to DIN 53240.

XVII. The viscoelastic elastomeric polyurethane foam according to one or more of embodiments I to XVI, wherein the proportion of ethylene oxide in the second polyether polyol (c) is in between 60 wt. % to 85 wt. % based on the weight of the second polyether polyol (c).

XVIII. The viscoelastic elastomeric polyurethane foam according to one or more of embodiments I to XVII, wherein the amount of the second polyether polyol (c) is in between 10.0 wt. % to 15.0 wt. %, based on the sum of (a), (b), (c) and (d).

XIX. The viscoelastic elastomeric polyurethane foam according to one or more of embodiments I to XVIII, wherein the at least one chain extender and/or crosslinker (d) is selected from ethylene glycol, 1,2-propanediol, 1,3-propanediol, 1-5 pentanediol, 1,6-hexanediol, 1,10-decanediol, 1,2-dihydroxycyclohexane, 1,3-dihydroxycyclohexane, 1,4-dihydroxycyclohexane, diethylene glycol, 1,4-butanediol, 1,6-hexanediol, bis(2-hydroxy-ethyl)hydroquinone, dipropylene glycol, glycerol, diethanolamine, and triethanolamine.

XX. The viscoelastic elastomeric polyurethane foam according to one or more of embodiments I to XIX, wherein the at least one chain extender and/or crosslinker (d) is triethanolamine.

XXI. The viscoelastic elastomeric polyurethane foam according to one or more of embodiments I to XX, wherein the amount of the at least one chain extender and/or crosslinker (d) is in between 0.1 wt. % to 2.0 wt. %, based on the sum of (a), (b), (c) and (d).

XXII. The viscoelastic elastomeric polyurethane foam according to one or more of embodiments I to XXI, wherein the hydrofluorocarbon (C2) is selected from 1,1,1,2-tetrafluoroethane, 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane, 1,1,3,3,3-pentafluoropropane, 1,1,1,3,3-pentafluoro-n-butane, 1,1,1,4,4,4-hexafluoro-n-butane, and 1,1,1,2,3,3,3-heptafluoropropane.

XXIII. The viscoelastic elastomeric polyurethane foam according to one or more of embodiments I to XXII, wherein the hydrofluorocarbon (C2) is 1,1,1,3,3-pentafluoropropane.

XXIV. The viscoelastic elastomeric polyurethane foam according to one or more of embodiments I to XXIII, wherein the hydrofluoroolefin (C3) is selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluoro-2-butene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form.

XXV. The viscoelastic elastomeric polyurethane foam according to one or more of embodiments I to XXIV, wherein the hydrofluoroolefin (C3) is cis-1,1,1,4,4,4-hexafluoro-2-butene.

XXVI. The viscoelastic elastomeric polyurethane foam according to one or more of embodiments I to XXV, wherein the amount of the blowing agent mixture (C) is in between 0.1 wt. % to 10 wt. %, based on the total weight of the isocyanate reactive component (B).

XXVII. The viscoelastic elastomeric polyurethane foam according to one or more of embodiments I to XXVI, wherein the reactive mixture further comprises at least one selected from catalysts (D), surfactants (E) and additives (F).

XXVIII. The viscoelastic elastomeric polyurethane foam according to one or more of embodiments I to XXVII, wherein the reaction takes place at an isocyanate index in between 70 to 120.

XXIX. The viscoelastic elastomeric polyurethane foam according to one or more of embodiments I to XXVIII, wherein the reaction takes place at an isocyanate index in between 90 to 110.

XXX. The viscoelastic elastomeric polyurethane foam according to one or more of embodiments I to XXIX, wherein the viscoelastic elastomeric polyurethane foam has a density in between 90 kg/m$^3$ to 450 kg/m$^3$, determined according to ASTM D1622; a recovery time adjustable between 10-60 s, determined according to ASTM D3574; water absorption of less than 10 wt. % after 24 h, determined according to ASTM D2842; and hysteresis loss at 75% deflection of upto 96%, hysteresis loss at 40% deflection of upto 83% determined according to ASTM D3574.

XXXI. A process for preparing the viscoelastic elastomeric polyurethane foam according to one or more of embodiments I to XXX.
XXXII. Use of the viscoelastic elastomeric polyurethane foam according to one or more of embodiments I to XXX or as obtained according to embodiment XXXI in a shaped article.
XXXIII. The use according to embodiment XXXII, wherein the shaped article is a protective equipment.
XXXIV. A shaped article comprising the viscoelastic elastomeric polyurethane foam according to embodiment I to XXX or as obtained according to embodiment XXXI.

EXAMPLES

The presently claimed invention is illustrated by the non-restrictive examples which are as follows:
Raw Materials

| POLYOL/CHAIN EXTENDER | |
|---|---|
| NP | Castor oil having average functionality of 2.7 and OH value in between 160 mg KOH/g to 165 mg KOH/g, obtained from Eagle Speciality Products |
| FP | Aromatic amine-initiated polyol having average functionality of 4.0 and OH value in between 285 mg KOH/g to 315 mg KOH/g, obtained from BASF |
| SP | Glycerol initiated polyoxypropylene-polyoxyethylene polyol having average functionality of 3.0, OH value in between 40 mg KOH/g to 50 mg KOH/g, with 75% EO - 25% PO heteric, obtained from BASF |
| OP 1 | Polymer polyol having average functionality of 3.0 and OH value in between 17 mg KOH/g to 21 mg KOH/g, obtained from BASF |
| OP 2 | Specialty polyol with a OH value in between 160.0 mg KOH/g to 180.0 mg KOH/g and average functionality of 3.0, obtained from BASF |
| CE | Triethanolamine |
| ISOCYANATE (ISO) | |
| ISO 1 | Short chain prepolymer based on 4,4'-MDI having NCO content of 23.0 wt. %, obtained from BASF |
| ISO 2 | Carbodiimide modified 4,4'-MDI having NCO content of 29.5 wt. %, obtained from BASF |
| BLOWING AGENT (BA) | |
| BA 1 | Water |
| BA 2 | 1,1,3,3,3-pentafluoropropane |
| BA 3 | cis-1,1,1,4,4,4-hexafluoro-2-butene, obtained from The Chemours Company |
| CATALYST (CAT) | |
| CAT 1 | DABCOR ® obtained from Evonik - a liquid mixture of 33% triethylenediamine and 67% mono-ethylene glycol |
| CAT 2 | DABCO ® 1027 obtained from Evonik - a non-acid-blocked delayed action catalyst diluted in ethylene glycol |
| CAT 3 | FOMREZ ® UL-22 obtained from Galata Chemicals (Artek) - Dimethyltin Mercaptide |
| CAT 4 | Polycat 77 ® obtained from Evonik - Tertiary amine catalyst [Bis-(dimethylaminopropyl) methylamine] |
| SURFACTANT (S) | |
| S1 | Ortegol ® 500 obtained from Evonik - silicone free |
| ADDITIVE (AD) | |
| AD 1 | Black REPITAN 99430 from REPI LLC. |
| AD 2 | Orange REMAP 30055 from REPI LLC. |

Standard Method

| DIN 53240 | OH value |
|---|---|
| ASTM D1622 | Density |
| ASTM D3574 | Compression force deflection (CFD) |
| ASTM D624 | Tear strength |
| ASTM D412 | Tensile strength, tensile modulus and elongation at break |
| ASTM D3574 | Compression set |

| DIN 53240 | OH value |
|---|---|
| ASTM D3574 | Recovery time |
| ASTM D2842 | Water absorption |
| ASTM D3574 | Hysteresis |

Cream Time

The time interval between the start of mixing and the point at which the reactive mixture begins to rise.

Gel Time

The time between the start of mixing and the time at which long "strings" or tacky material can be pulled from the interior of the rising mass by inserting and withdrawing a wooden stick.

Full Rise Time/End of Rise Time

The time between the start of mixing and the completion of expansion of the foaming mass.

Tack Free Time

The time between the start of mixing and the time that the surface of the foam can be touched with a finger or tongue depressor without sticking.

Free rise density (FRD)=net foam weight/cup volume 150 gm mixture of the A-side component and B-side component for each example in Table 1 was shot to a 0.946

L paper cup. Foam rising was then monitored and cream time, gel time, end of rise time, tack free time and top of cup time were recorded.

When the cup foam was cooled, the foam was cut for free rise density evaluation, as above.

For hand mix samples in 0.946 L paper cup, the A-side component and B-side component were mixed using a drill press/mixing station and cream time, top of Cup, gel time, end of rise time, and tack free time were subsequently recorded.

General Synthesis of Viscoelastic Elastomeric PU Foam
Preparation of B-Side Components Mixture or Resin:

The below-mentioned ingredients (refer Table 1, B-side Components except blowing agents), were added to a container or a drum for mixing by using a standard mixer. Then the container or drum was sealed and moved to a cold room. The mixture was kept in cold room till it was ready for introducing blowing agents. Once the blowing agents were added, the resulting mixture was mixed in a standard mixer for 20 minutes, to ensure a homogeneous mixture. The mixture was stored at room temperature or in cold room till it is ready to use.

Foam articles were produced in a mold with a desired thickness: 12.7 mm thick foam samples were cut, and their properties were determined in accordance with the abovementioned standard methods.

The PU foams thus obtained were subsequently cut into different sizes according to the abovementioned samples and the properties determined are reported in Tables 2-5 below.

TABLE 1

Inventive and comparative examples

| Ingredient | IE 1 | IE 2 | IE 3 | IE 4 | IE 5 | IE 6 | IE 7 | IE 8 | CE 1 | CE2 |
|---|---|---|---|---|---|---|---|---|---|---|
| A-SIDE COMPONENT (wt. %) | | | | | | | | | | |
| ISO 1 | 50 | 50 | 50 | 50 | 50 | 50 | 50 | 50 | 50 | 50 |
| ISO 2 | 50 | 50 | 50 | 50 | 50 | 50 | 50 | 50 | 50 | 50 |
| % NCO | 26.3 | 26.3 | 26.3 | 26.3 | 26.3 | 26.3 | 26.3 | 26.3 | 26.3 | 26.3 |
| B-SIDE COMPONENT (wt. %) | | | | | | | | | | |
| NP | 74.88 | 74.88 | 74.08 | 74.08 | 74.89 | 74.89 | 69.64 | 69.64 | 75.38 | 75.38 |
| FP | 2.00 | 2.00 | 2.00 | 2.00 | 2.00 | 2.00 | 2.00 | 2.00 | 2.00 | 2.00 |
| SP | 12.00 | 12.00 | 12.00 | 12.00 | 11.00 | 11.00 | 10.00 | 10.00 | 12.00 | 12.00 |
| OP 1 | — | — | — | — | — | — | 5.00 | 5.00 | — | — |
| OP 2 | — | — | — | — | — | — | — | — | 4.00 | 4.00 |
| CE | 0.81 | 0.81 | 0.81 | 0.81 | 0.90 | 0.90 | 1.00 | 1.00 | 0.80 | 0.80 |
| BA 1 | 0.20 | 0.20 | 0.20 | 0.20 | 0.30 | 0.30 | 0.25 | 0.25 | 0.91 | 0.91 |
| BA 2 | 6.00 | 6.00 | 6.00 | 6.00 | — | — | — | — | — | — |
| BA 3 | — | — | — | — | 6.00 | 6.00 | 7.50 | 7.50 | — | — |
| CAT 1 | 2.00 | 2.00 | 2.000 | 2.00 | 2.00 | 2.00 | 1.80 | 1.80 | 1.80 | 1.80 |
| CAT 2 | 0.90 | 0.90 | 0.90 | 0.90 | 0.90 | 0.90 | 0.80 | 0.80 | 0.80 | 0.80 |
| CAT 3 | 0.010 | 0.010 | 0.010 | 0.010 | 0.005 | 0.005 | 0.005 | 0.005 | 0.005 | 0.005 |
| CAT 4 | — | — | — | — | — | — | — | — | 0.30 | 0.30 |
| S1 | 1.00 | 1.00 | 1.00 | 1.00 | 1.00 | 1.00 | 1.00 | 1.00 | 1.00 | 1.00 |
| AD 1 | — | — | 1.00 | 1.00 | — | — | 1.00 | 1.00 | 1.00 | 1.00 |
| AD 2 | 0.20 | 0.20 | — | — | 1.00 | 1.00 | — | — | — | — |

TABLE 2

PU foam properties

| Properties | IE 1 | IE 2 | IE 3 | IE 4 | IE 5 | IE 6 | IE 7 | IE 8 | CE 1 | CE 2 |
|---|---|---|---|---|---|---|---|---|---|---|
| Index | 95 | 90 | 95 | 100 | 95 | 100 | 95 | 100 | 90 | 85 |
| Cream Time, s | 9 | 9 | 11 | 12 | 10 | 9 | 11 | 10 | 8 | 8 |
| Top of cup time, s | 18 | 18 | 37 | 37 | 26 | 25 | 32 | 30 | 21 | 22 |
| Gel time, s | 33 | 33 | 58 | 55 | 42 | 41 | 51 | 50 | 35 | 36 |
| End of rise time, s | 58 | 51 | 83 | 82 | 68 | 67 | 96 | 97 | 65 | 66 |
| Tack free time, s | 75 | 70 | 108 | 105 | 96 | 94 | 140 | 139 | 70 | 75 |
| FRD, kg/m$^3$ | 112.3 | 113.42 | 103.33 | 100.61 | 105.73 | 105.09 | 98.68 | 97.56 | 100.13 | 101.41 |

TABLE 3

Mechanical and viscoelastic properties of the PU foam

| Properties | IE 1 | IE 2 | IE 3 | IE 4 | IE 5 | IE 6 | IE 7 | IE 8 | CE 1 | CE 2 |
|---|---|---|---|---|---|---|---|---|---|---|
| Index | 95 | 90 | 95 | 100 | 95 | 100 | 95 | 100 | 90 | 85 |
| Density, kg/m$^3$ | 240.3 | 240.3 | 240.3 | 144.18 | 144.18 | 240.30 | 96.12 | 96.12 | 240.3 | 240.30 |
| CFD (50% deflection, dwell 0 minute) | 0.96 | 0.57 | 0.75 | 0.37 | 0.67 | 2.98 | 0.13 | 0.38 | 3.77 | 1.39 |
| CFD (50% deflection, dwell 1 minute) | 0.45 | 0.37 | 0.39 | 0.14 | 0.21 | 0.74 | 0.06 | 0.11 | 1.12 | 0.68 |
| Compression Set (50% deflection, 50° C., 6 h), % | 1.35 | 0.45 | 0.69 | 1.84 | 0.66 | 1.03 | 5.89 | 3.33 | 3.41 | 6.46 |
| Recovery time, s | 22 | 11 | 12 | 49 | 60 | 60 | 60 | 60 | 60 | 60 |
| Tear strength, kg/cm | 2.09 | 1.34 | 1.85 | 1.37 | 1.63 | 3.47 | 0.77 | 1.21 | 3.99 | 2.69 |
| Tensile strength, kg/cm$^2$ | 6.10 | 3.35 | 4.87 | 3.09 | 3.78 | 9.51 | 1.97 | 3.81 | 10.98 | 8.04 |
| Elongation, % | 183.63 | 167.05 | 189.78 | 169.53 | 154.83 | 148.15 | 181 | 164 | 112.2 | 136.03 |
| Tensile-Elastic Modulus, kg/cm$^2$ | 3.63 | 2.35 | 3.65 | 2.03 | 2.15 | 7.38 | 0.33 | 1.60 | 12.83 | 29.54 |

As evident in Table 3, both the mechanical and viscoelastic properties of the inventive examples were comparable with the comparative examples. For impact attenuation applications, selection of the formulation is based on the combination of properties desired.

In general, compared to commercially available foams for the same impact absorption applications, e.g. same density, inventive PU foam shows significant improvement in mechanical properties. For e.g. the improved compression set, CFD, and elongation properties can be very beneficial— for such applications. For e.g. commercially available foams for the same applications, at same density, generally show compression set, for e.g. >3.80%, lower elongation, e.g. <100%, CFD>0.98. In addition to improved physical properties, the comfort is also important for end-use. The adjustable hardness adds benefit to product design and comfort. The tensile-elastic modulus is indicative of the strength and stiffness of the foam and can be referenced for preferred applications when selecting formulations. The inventive examples, as above, demonstrate good quality foams and soft touch feel attributed to the chemistry.

TABLE 4

Effect of blowing agent and index on physical properties

| Properties | IE 5 | IE 6 | CE 1 | CE 2 |
|---|---|---|---|---|
| BA | BA1 + BA3 | BA1 + BA3 | BA1 | BA1 |
| Index | 95 | 100 | 90 | 85 |
| Density, kg/m$^3$ | 144.18 | 144.18 | 144.18 | 144.18 |
| CFD (50% deflection, dwell 0 minute) | 0.671 | 1.375 | 0.962 | 0.491 |
| CFD (50% deflection, dwell 1 minute) | 0.208 | 0.279 | 0.31 | 0.227 |
| Compression Set (50% deflection, 50° C., 6 h), % | 0.66 | 0.33 | 6.707 | 9.8 |
| Tear strength, kg/cm | 1.63 | 2.16 | 2.29 | 1.73 |
| Tensile strength, kg/cm$^2$ | 3.78 | 5.14 | 6.14 | 4.095 |
| Elongation, % | 154.83 | 149.8 | 118.4 | 137.58 |
| Tensile-Elastic Modulus, kg/cm$^2$ | 2.15 | 3.53 | 5.7 | 14.94 |

As evident in Table 4, comparing the foams produced from water-blown system to the foams produced from HFO/water co-blown, despite having same density, the comparative PU foams resulted in high compression set, stiffer and low elastic properties. Thus, the elastomeric behaviour is no longer similar to that of the inventive examples. For some applications in protective equipment, strong but softer foams have advantages with regards to flexibility and comfort.

Despite having similar density, the comparative PU foams resulted in uncompetitive compression set and elongation properties. Thus, the elastomeric behaviour is no longer similar to that of the inventive examples. This makes the inventive PU foams more suitable for the impact applications, as described herein.

TABLE 5a

Effect of blowing agent, density and index on hysteresis at 40%

| Properties | IE1 | IE1 | IE 5 | IE 5 | IE 6 | IE 6 | IE 7 | IE 8 | CE 2 | CE 2 |
|---|---|---|---|---|---|---|---|---|---|---|
| BA | BA1 + BA2 | BA1 + BA2 | BA1 + BA3 | BA1 + BA3 | BA1 + BA3 | BA1 + BA3 | BA1 + BA3 | BA1 + BA3 | BA1 | BA1 |
| Index | 95 | 95 | 95 | 95 | 100 | 100 | 95 | 100 | 85 | 85 |
| Density, kg/m³ | 240.3 | 192.24 | 240.3 | 144.18 | 240.30 | 144.18 | 96.12 | 96.12 | 240.30 | 144.18 |
| Hysteresis at 40%, % | 63.25 | 72.70 | 69.30 | 73.35 | 80.45 | 81.55 | 72.00 | 83.00 | 62.05 | 61.30 |

TABLE 5b

Effect of density and index on hysteresis at 75%

| Properties | IE1 | IE 5 | IE 7 | IE 8 | CE 2 |
|---|---|---|---|---|---|
| BA | BA1 + BA2 | BA1 + BA3 | BA1 + BA3 | BA1 + BA3 | BA1 |
| Index | 95 | 95 | 95 | 100 | 85 |
| Density, kg/m³ | 240.3 | 240.3 | 96.12 | 96.12 | 144.18 |
| Hysteresis at 75%, % | 79.350 | 83.85 | 88.90 | 95.70 | 78.700 |

As evident above, compared to commercially available foams for the same impact absorption applications, viscoelastic elastomeric PU foam discussed in the invention showcase significant improvement in energy absorption performance, even at lower density. Hysteresis loss of inventive examples listed in Tables 5a and 5b, at 75% deflection, upto 96%; at 40% deflection of upto 83% determined according to ASTM D3574, was considered to be greatly effective in impact attenuation applications, in particular, as a measure of energy absorbed, inventive examples show excellent performance in energy absorption at lower density.

As evident in Table 5a and 5b, the hardness (adjusted by index) and density impact hysteresis property. In general, foams made from same formulation at same index, the lower-density foam showed better performance in impact absorption, and therefore, the inventive examples outperform the comparative samples.

In general, the comparative examples from water-blown system had a quite uniform density from skin to core, typically had an open-cell structures. The water-blown system was typically processed at lower indices and the processing window was quite narrow. If the system was reacted at index greater than 90 or lower than 85, these comparative foams were either becoming too hard or too soft, and therefore, not comparable with the viscoelastic elastomeric PU foam of the inventive examples. On the contrary, the inventive PU foams had an interesting density profile from skin (dense) to core (less dense), it had microcellular structure. Moreover, the blowing agent/water co-blown system had a wider processing latitude, e.g. from index 85-105, therefore it was advantageous for hardness adjustment, which was limited for the comparative PU foams (water blown systems).

Further, as evident in Tables 5a and 5b, a considerable increase in hysteresis % was observed in IE 1 HFC/H2O system, at same index and lower density (refer IE 1 at a density 240.3 kg/m³ vs. density 192.24 kg/m³). Interestingly, for HFO/H2O system, a slight increase in hysteresis % was observed at same index and lower density (refer e.g. HFO/H2O, IE 5 and IE 6, density 240.3 kg/m³ vs. density 144.18 kg/m³). In either case described herein, it was advantageous for selecting lightweight foams for end-use products. For e.g. the foams described herein, can obtain the same or better overall impact absorption performance, it can also result in density reduction 20-50% as compared to commercially available foams for the same impact absorption application.

As mentioned above, the viscoelastic elastomeric PU foam with a microcellular structure described herein has skin-core density profile. Upon impact, the foam stiffens dynamically, and it delays force transmission rate dynamically. Unlike the state-of-the-art flexible PU foam with open-cell structure, the foam in the invention worked synergistically from skin to core to absorb impact energy, which could provide novel solutions for impact energy management.

The invention claimed is:

1. A viscoelastic elastomeric polyurethane foam obtained by reacting a reactive mixture comprising:
  (A) an isocyanate component comprising at least one isocyanate prepolymer (A1), wherein the isocyanate component has an NCO content in between 10 wt. % to 30 wt. %, and
  (B) an isocyanate reactive component comprising a mixture of
    (a) 60 wt. % to 95 wt. % of at least one natural oil polyol having an average functionality in between 2.0 to 4.0 and OH value in between 30 mg KOH/g to 600 mg KOH/g, determined according to DIN 53240,
    (b) 0.1 wt. % to 10.0 wt. % of at least one first polyether polyol having an average functionality in between 2.5 to 5.0 and OH value in between 200 mg KOH/g to 450 mg KOH/g, determined according to DIN 53240, which is prepared by addition of at least one alkylene oxide onto an amine,
    (c) 1.0 wt. % to 30.0 wt. % of at least one second polyether polyol having an average functionality in between 2.0 to 4.0 and OH value in between 20 mg KOH/g to 200 mg KOH/g, determined according to DIN 53240, which is prepared by addition of ethylene oxide and propylene oxide onto at least one H-functional starter substance, wherein the proportion of ethylene oxide is in between 40 wt. % to 95 wt. % based on the weight of the at least one second polyether polyol, and (d) 0 wt. % to 10.0 wt. % of at least one chain extender and/or crosslinker having a molecular weight in between 40 g/mol to 499 g/mol, wherein wt. % of the at least one natural oil polyol, the at least one first polyether polyol, the at least one second polyether polyol, and the at least one chain extender and/or crosslinker are based on the sum of (a), (b), (c) and (d), in the presence of (C) a blowing agent mixture comprising water (C1) and at least one hydrofluorocarbon (C2), or water (C1) and at least one hydrofluoroolefin (C3).

2. The viscoelastic elastomeric polyurethane foam according to claim 1, wherein the isocyanate component (A) further comprises at least one isocyanate component selected from the group consisting of carbodiimide-modified isocyanates (A2), polymeric methylene diphenyl diisocyanate (A3), isocyanates (A4) comprising biuret and/or isocyanurate groups, and diphenylmethane 2,2'-, 2,4'- and/or 4,4'-diisocyanate (A5).

3. The viscoelastic elastomeric polyurethane foam according to claim 1, wherein the isocyanate component is a mixture of the at least one isocyanate prepolymer (A1) and (A2) carbodiimide-modified isocyanates.

4. The viscoelastic elastomeric polyurethane foam according to claim 1, wherein the amount of the at least one isocyanate prepolymer (A1) is in between 10 wt. % to 90 wt. %, based on the total weight of the isocyanate component (A).

5. The viscoelastic elastomeric polyurethane foam according to claim 2, wherein the carbodiimide-modified isocyanates (A2) are selected from carbodiimide-modified diphenylmethane 2,2'-, 2,4'- and 4,4'-diisocyanates.

6. The viscoelastic elastomeric polyurethane foam according to claim 1, wherein the at least one natural oil polyol is castor oil and/or hydrogenated castor oil.

7. The viscoelastic elastomeric polyurethane foam according to claim 1, B wherein the amine in the at least one first polyether polyol is selected from the group consisting of toluenediamine, phenylenediamine, diaminodiphenylmethane, and isomers thereof.

8. The viscoelastic elastomeric polyurethane foam according to claim 1, B wherein the proportion of ethylene oxide in the at least one second polyether polyol is in between B 60 wt. % to 85 wt. % based on the weight of the at least one second polyether polyol.

9. The viscoelastic elastomeric polyurethane foam according to claim 1, wherein the at least one hydrofluorocarbon (C2) is 1,1,1,3,3-pentafluoropropane.

10. The viscoelastic elastomeric polyurethane foam according to claim 1, wherein the at least one hydrofluoroolefin (C3) is cis-1,1,1,4,4,4-hexafluoro-2-butene.

11. The viscoelastic elastomeric polyurethane foam according to claim 1, wherein the reactive mixture further comprises at least one further component selected from the group consisting of catalysts (D), surfactants (E) and additives (F).

12. The viscoelastic elastomeric polyurethane foam according to claim 1, wherein the reaction takes place at an isocyanate index in between 70 to 120.

13. A process for preparing the viscoelastic elastomeric polyurethane foam according to claim 1, the process comprising mixing (A), (B), and (C).

14. A shaped article comprising the viscoelastic elastomeric polyurethane foam according to claim 1.

* * * * *